US012601642B2

(12) United States Patent
Hibino et al.

(10) Patent No.: US 12,601,642 B2
(45) Date of Patent: Apr. 14, 2026

(54) HEADSET

(71) Applicant: FOSTER ELECTRIC COMPANY, LIMITED, Tokyo (JP)

(72) Inventors: Yo Hibino, Akishima (JP); Yasuo Kawana, Akishima (JP); Hikaru Watanabe, Akishima (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 307 days.

(21) Appl. No.: 18/284,854

(22) PCT Filed: Mar. 24, 2022

(86) PCT No.: PCT/JP2022/014079
§ 371 (c)(1),
(2) Date: Sep. 28, 2023

(87) PCT Pub. No.: WO2022/210283
PCT Pub. Date: Oct. 6, 2022

(65) Prior Publication Data
US 2024/0183722 A1 Jun. 6, 2024

(30) Foreign Application Priority Data

Mar. 31, 2021 (JP) ................................. 2021-060540

(51) Int. Cl.
*G01K 13/20* (2021.01)
*G01K 1/02* (2021.01)
*G01K 1/14* (2021.01)

(52) U.S. Cl.
CPC ............. *G01K 13/20* (2021.01); *G01K 1/026* (2013.01); *G01K 1/14* (2013.01); *G01K 2213/00* (2013.01)

(58) Field of Classification Search
None
See application file for complete search history.

(56) References Cited

U.S. PATENT DOCUMENTS 4,035,654 A * 7/1977 Elmer .................... G01B 11/27
250/342
2002/0035340 A1 3/2002 Fraden et al.
(Continued)

FOREIGN PATENT DOCUMENTS

CN 104545827 A 4/2015
JP 2007-212407 A 8/2007
(Continued)

OTHER PUBLICATIONS

Search Report and Written Opinion in International Application No. PCT/JP2022/014079 dated May 31, 2022, 11 pages.
(Continued)

*Primary Examiner* — Erica S Lin
(74) *Attorney, Agent, or Firm* — MARSHALL, GERSTEIN & BORUN LLP

(57) ABSTRACT

A headset includes: a hollow housing to be worn at an ear of a user; a cylindrical ear canal insertion part that is a portion of the housing, and that is provided at a portion of the housing at a side of an ear canal; a thermistor for a headset, provided at the ear canal side inside the housing; a temperature sensor for a headset on a main substrate, provided at an opposite side from the ear canal side inside the housing; and a calculation unit that measures a body temperature of the user based on an output of the thermistor and an output of the temperature sensor.

8 Claims, 15 Drawing Sheets

(56)　　　　　　References Cited

U.S. PATENT DOCUMENTS

| | | |
|---|---|---|
| 2013/0183939 A1 | 7/2013 | Kakehi |
| 2014/0348339 A1 | 11/2014 | Tseng |
| 2015/0023516 A1* | 1/2015 | Rabii ................... H04R 1/1041 |
| | | 381/74 |
| 2019/0117155 A1* | 4/2019 | Cross ................... H04R 25/652 |
| 2019/0253793 A1 | 8/2019 | Pedersen et al. |

FOREIGN PATENT DOCUMENTS

| | | |
|---|---|---|
| JP | 2014-194365 A | 10/2014 |
| WO | WO-2012/053289 A1 | 4/2012 |

OTHER PUBLICATIONS

Koki Ikejiri et al., "A study of the calibration for the core body temperature calculation using ear canal temperature measured by thermistor" [No. 19-306], Symposium of Japan Soc. of Mechanical Engineers: Sports Engineering and Human Dynamics, 2019, Collected Papers, 5 pages.

* cited by examiner

TEMPERATURE DIFFERENCE $t_B$
FROM DEEP BODY TEMPERATURE

TEMPERATURE DIFFERENCE $t_e$
INSIDE HEADSET

TEMPERATURE DIFFERENCE $t_A$
FROM ROOM TEMPERATURE

Figure 7:
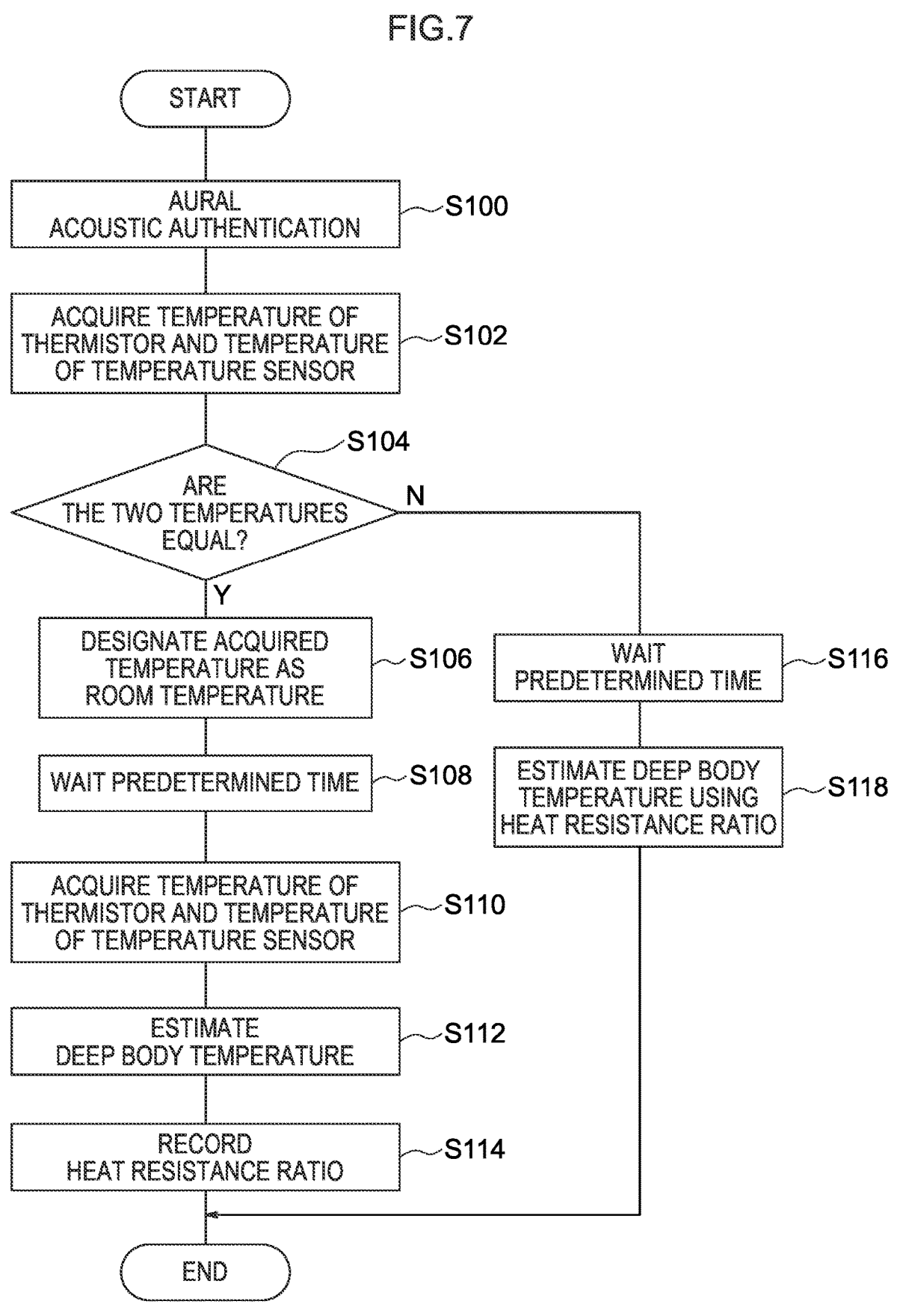

START

AURAL ACOUSTIC AUTHENTICATION ～S100

ACQUIRE TEMPERATURE OF THERMISTOR AND TEMPERATURE OF TEMPERATURE SENSOR ～S102

S104

ARE THE TWO TEMPERATURES EQUAL?

Y

N

DESIGNATE ACQUIRED TEMPERATURE AS ROOM TEMPERATURE ～S106

WAIT PREDETERMINED TIME ～S116

WAIT PREDETERMINED TIME ～S108

ESTIMATE DEEP BODY TEMPERATURE USING HEAT RESISTANCE RATIO ～S118

ACQUIRE TEMPERATURE OF THERMISTOR AND TEMPERATURE OF TEMPERATURE SENSOR ～S110

ESTIMATE DEEP BODY TEMPERATURE ～S112

RECORD HEAT RESISTANCE RATIO ～S114

END

FIG.9

| TEMPERATURE TRANSFER SYSTEM | TEMPERATURE DIFFERENCE | | | HEAT RESISTANCE | | |
| --- | --- | --- | --- | --- | --- | --- |
| | $t_A$ | $t_e$ | $t_B$ | $R_A$ | $R_e$ | $R_B$ |
| 1. TEMPERATURE SENSOR & PROXIMITY SENSOR | $t_{Ai}$ | $t_i + t_m$ | $t_{Bm}$ | $R_{Ai}$ | $R_i + R_m$ | $R_{Bm}$ |
| 2. TEMPERATURE SENSOR & THERMISTOR | $t_{Ai}$ | $t_i + t_n$ | $t_{Bn}$ | $R_{Ai}$ | $R_i + R_n$ | $R_{Bn}$ |
| 3. TOUCH PAD & PROXIMITY SENSOR | $t_{Aj}$ | $t_j + t_m$ | $t_{Bm}$ | $R_{Aj}$ | $R_j + R_m$ | $R_{Bm}$ |
| 4. TOUCH PAD & THERMISTOR | $t_{Aj}$ | $t_j + t_n$ | $t_{Bn}$ | $R_{Aj}$ | $R_j + R_n$ | $R_{Bn}$ |

REPRODUCTION
UNIT

218

12

18

14

22

24

224

CALCULATION
UNIT

16

23

COMMUNICATION
UNIT

FIG.13
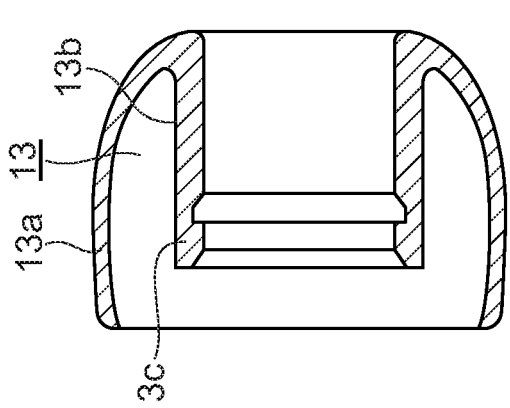
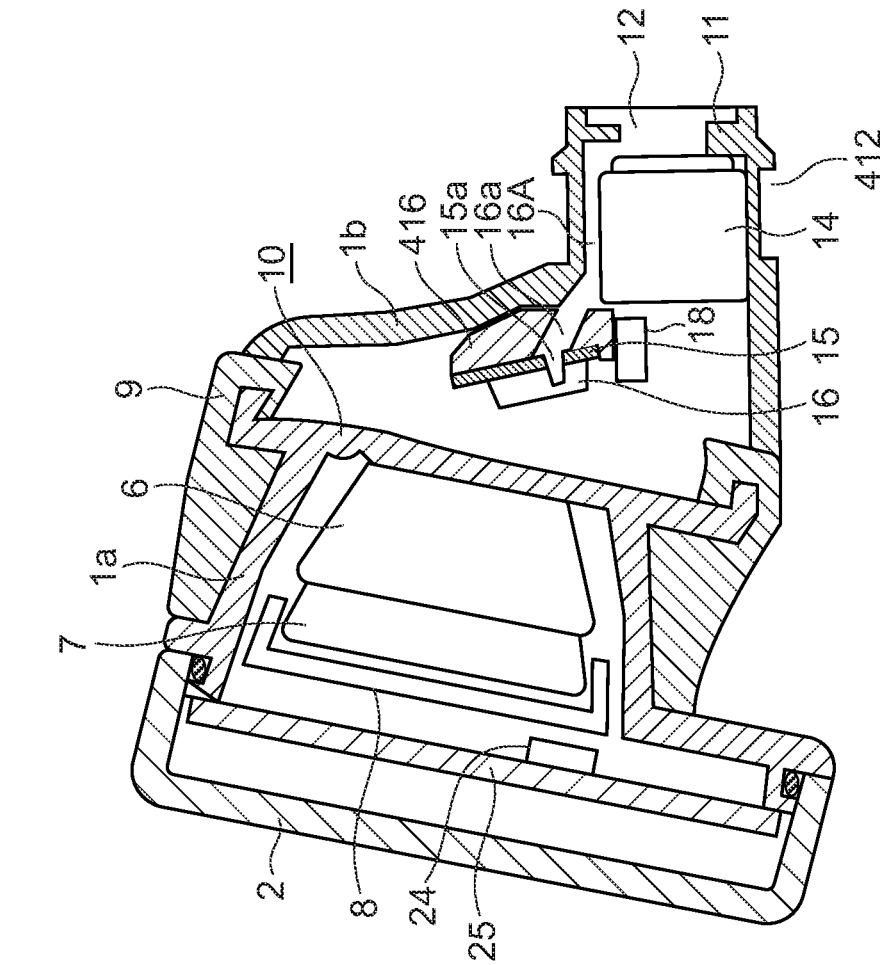

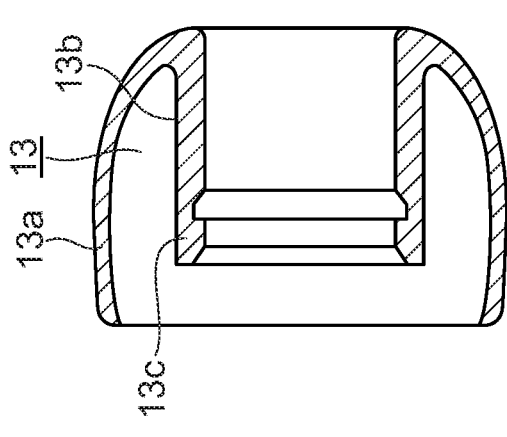
FIG.14
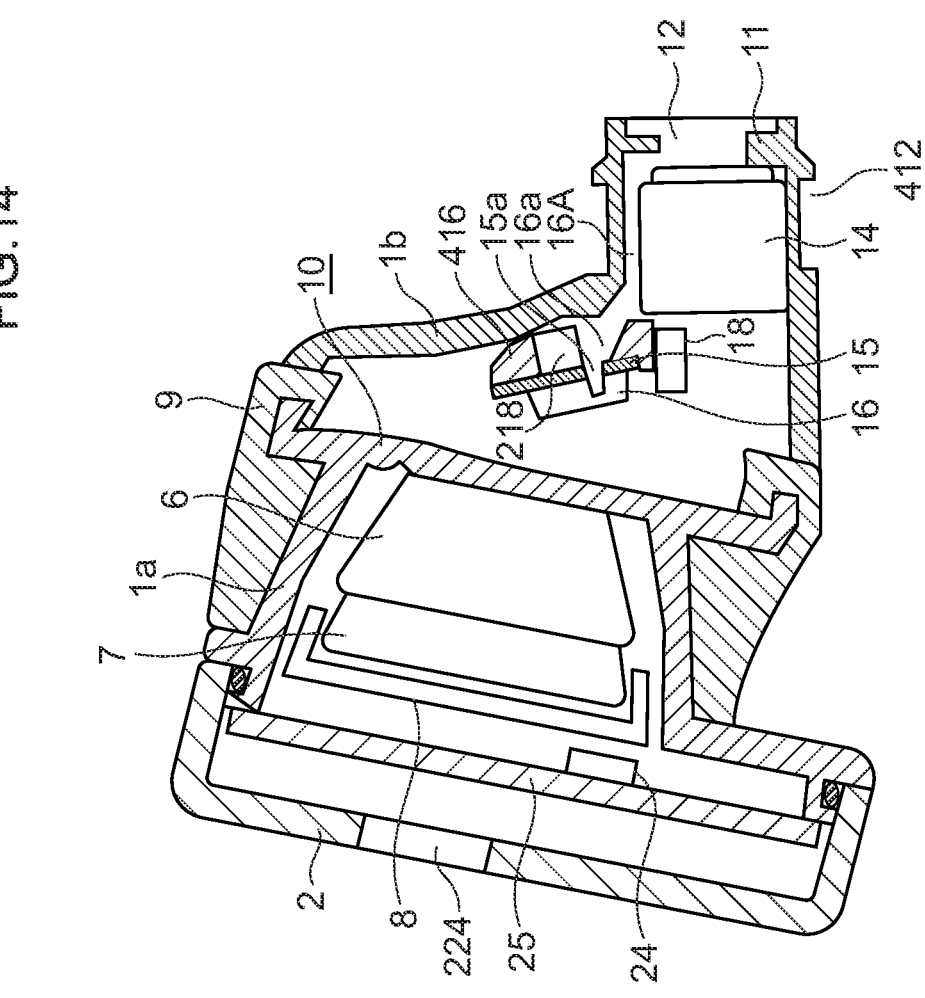

HEADSET

TECHNICAL FIELD

The technique of the present disclosure relates to a headset.

BACKGROUND ART

Conventionally, techniques for measuring body temperature in a deep part of a body are known (for example, Patent Document 1 and Non-Patent Document 1).

For example, Japanese Patent Application Laid-open (JP-A) No. 2007-212407 discloses a non-heating-type deep body thermometer in which a first temperature sensor and a second temperature sensor are provided in order from a measurement surface side that contacts the body surface, and a thermal insulator is provided between the first temperature sensor and the second temperature sensor. The non-heating-type deep body thermometer includes at least two sets of temperature sensors—namely, a set of the first temperature sensor and the second temperature sensor, and a set of the first temperature sensor and the second temperature sensor—and is characterized in that for each set of the first temperature sensor and the second temperature sensor, the thermal resistance value of the heat insulating material between the first temperature sensor and the second temperature sensor is different.

In Kouki Ikejiri et al., "Study on calibration for calculating deep body temperature using external auditory canal temperature measured with thermistor" [No. 19-306], Symposium of Japan Soc. of Mechanical Engineers: Sports Engineering and Human Dynamics, 2019, Collected Papers, a technique for calculating deep body temperature using the external auditory canal temperature measured by a thermistor is disclosed.

SUMMARY OF INVENTION

Problem to be Solved by the Invention

As described above, the conventional art requires the addition of a body temperature sensor, which complicates the device configuration of the headset.

An object of the technique of the present disclosure is to provide a headset capable of accurately measuring body temperature without adding a sensor for measuring body temperature.

Means for Solving the Problem

A first aspect of the present disclosure is a headset, including: a hollow housing to be worn at an ear of a user; a cylindrical ear canal insertion part that is a portion of the housing, and that is provided at a portion of the housing at a side of an ear canal; a first sensor for a headset, provided at the ear canal side inside the housing; a second sensor for a headset, provided at an opposite side from the ear canal side inside the housing; and a calculation unit that measures a body temperature of the user based on an output of the first sensor and an output of the second sensor.

Effect of the Invention

According to the first aspect of the present disclosure, the body temperature of the user is measured based on the outputs of a first sensor for a headset provided inside the housing at the ear canal side and a second sensor for a headset provided inside the housing at the opposite side from the ear canal. Thereby, the body temperature can be measured with high accuracy without adding a sensor for body temperature measurement.

BRIEF DESCRIPTION OF DRAWINGS

FIG. 3 is a cross-sectional view showing the overall configuration of a headset according to the first embodiment of the technique of the present disclosure.

FIG. 7 is a flow chart showing details of temperature measurement processing by the headset according to the first embodiment of the technique of the present disclosure.

FIG. 9 is a diagram for explaining parameters used in estimating deep body temperature.

FIG. 10 is a cross-sectional view showing the overall configuration of a headset according to the second embodiment of the technique of the present disclosure.

FIG. 13 is a cross-sectional view showing the overall configuration of the headset according to Example 1.

FIG. 14 is a cross-sectional view showing the overall configuration of the headset according to Example 2.

DESCRIPTION OF THE PREFERRED EMBODIMENTS

Best Mode for Carrying Out the Invention

Hereinafter, embodiments of the technique of the present disclosure will be described in detail with reference to the drawings.

First Embodiment

<Outline of First Embodiment of Technique of Present Disclosure>

In a first embodiment of the technique of the present disclosure, deep body temperature is determined using sensors provided for conventional headsets without additional configuration for measuring deep body temperature.

As an example, a deep body temperature is measured with a temperature transfer system that includes a basic sensor configuration of a "thermistor" and a "temperature sensor on the main substrate."

Figure 1:
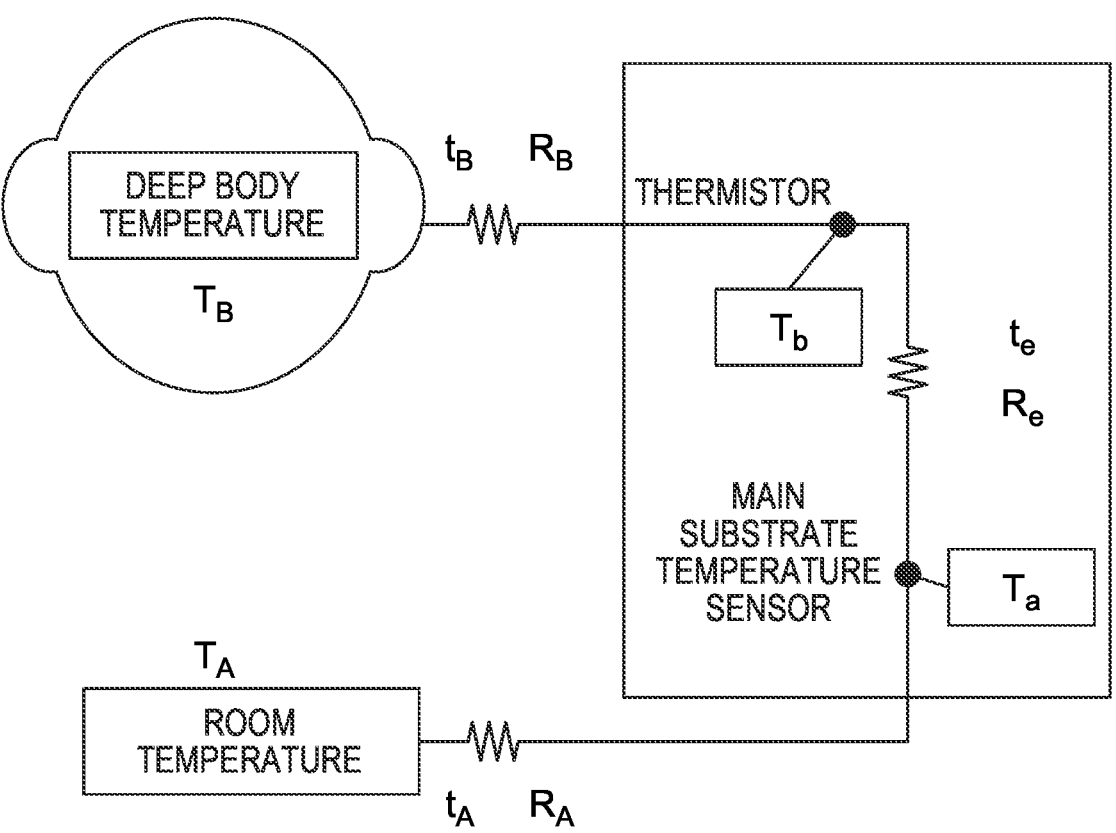
FIG. 1 is a diagram for explaining a method of estimating deep body temperature with a headset according to a first embodiment of the technique of the present disclosure.
Figure 2:
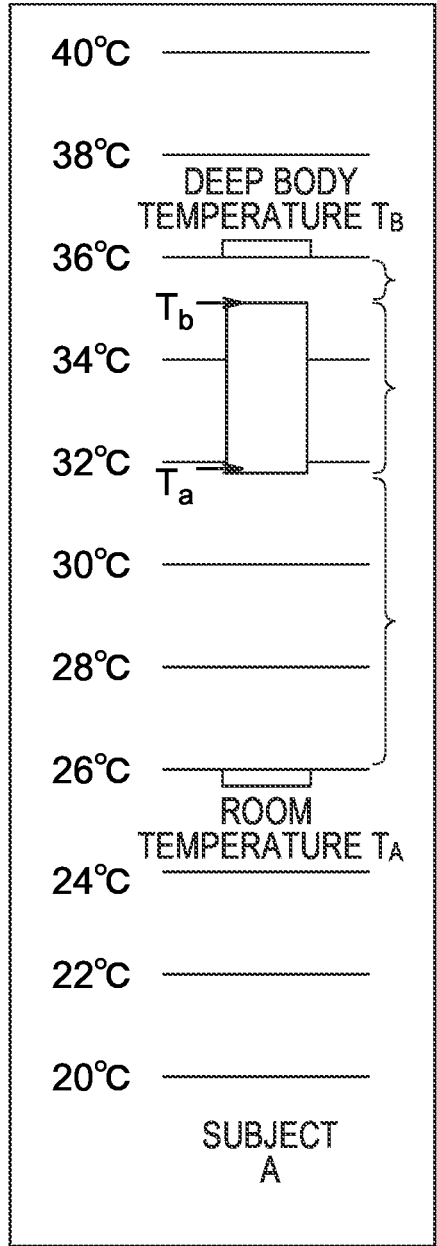
FIG. 2 is a diagram for explaining parameters used in estimating deep body temperature.

FIGS. 1 and 2 show the configuration of thermal resistance and parameters in this temperature transfer system.

The temperature measured by the thermistor is $T_b$, the temperature measured by the temperature sensor on the main substrate is $T_a$, room temperature is $T_A$, and the deep body temperature is $T_B$. In addition, the temperature difference between the room temperature $T_A$ and the temperature $T_a$ is a first temperature difference $t_A$, a temperature difference inside the headset, which is the temperature difference between the temperature $T_b$ and the temperature $T_a$, is a second temperature difference $t_e$, and the temperature difference between the deep body temperature $T_B$ and the temperature $T_b$ is $t_B$. Moreover, the thermal resistance corresponding to the temperature difference $t_A$ is $R_A$, the thermal resistance corresponding to the temperature difference $t_e$ is $R_e$, and the thermal resistance corresponding to the temperature difference $t_B$ is $R_B$.

As preparation for measurement—that is, as parameter creation during headset development—based on the room temperature $T_A$ and the deep body temperature $T_B$ measured in advance using a thermometer and a body thermometer, a "value $R_B/R_e$" and a "distribution of $t_B/t_e$ relative to $t_e/t_A$" are calculated.

Further, in measurement of the deep body temperature, the temperature difference $t_A$, the temperature difference $t_e$, the temperature difference $t_B$, and the deep body temperature $T_B$ are calculated.

Here, regarding the room temperature $T_A$, the temperature in a state in which the temperature of the entire headset housing is constant (a state in which temperatures $T_a$, $T_b$ are equal) without any local temperature rises due to body temperature, is the room temperature $T_A$.

Further, in a case in which the headset is locally warmed by the body temperature and the room temperature $T_A$ cannot be calculated, the deep body temperature $T_B$ is calculated using parameters that were used in a previous body temperature measurement.

<Configuration of Headset of First Embodiment of Technique of Present Disclosure>

Figure 3:
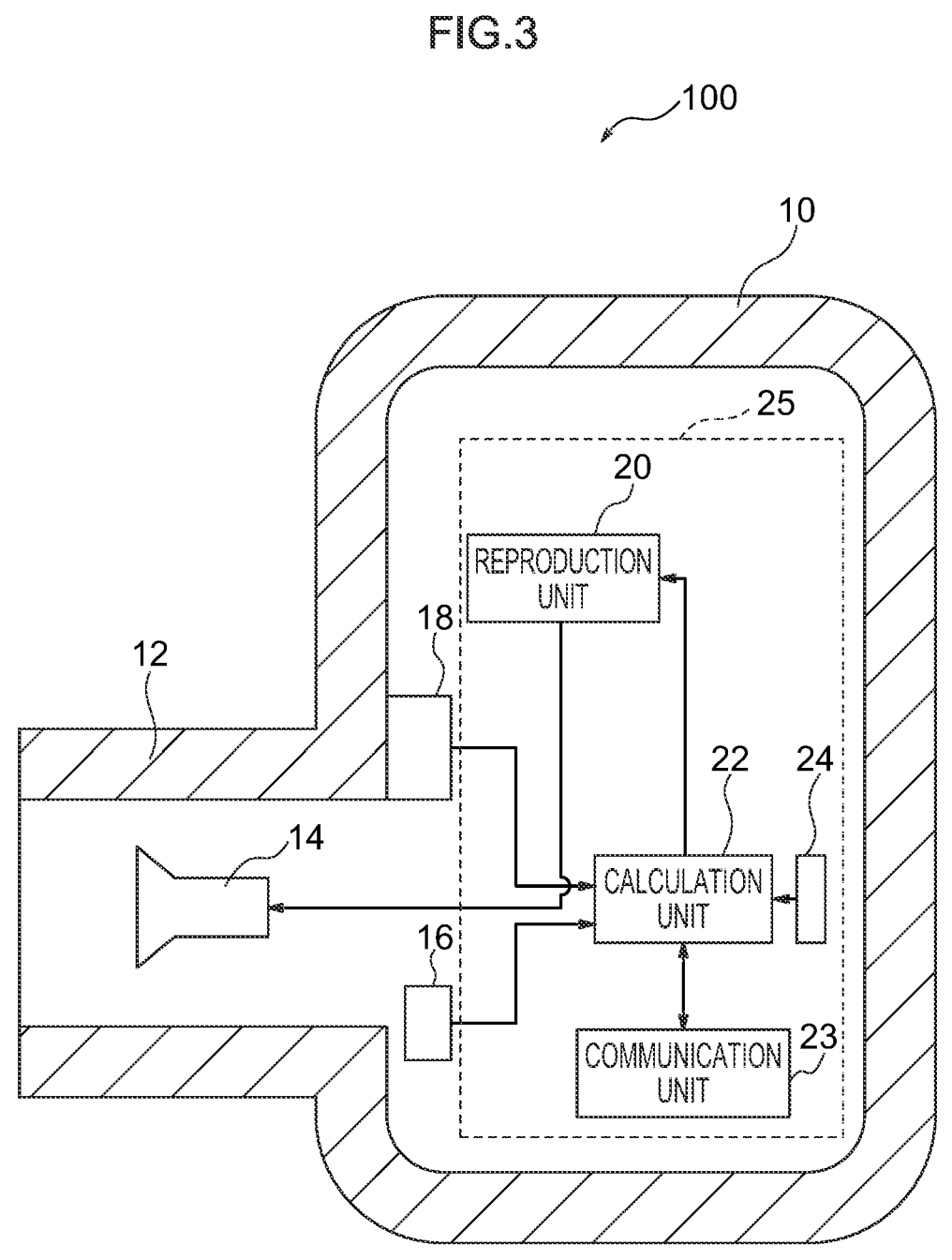

As shown in FIG. 3, a headset 100 according to the first embodiment of the technique of the present disclosure has a hollow housing 10 that is worn at a user's ear and that contains various functional components inside. The housing 10 is a casing of the headset 100. Moreover, the headset 100 has a cylindrical external auditory canal insertion part 12 that is one part of the housing 10 and that has a hollow part provided in a part of the housing 10 at the side of the external auditory canal when worn at the users ear.

Further, the headset 100 has a driver 14 for audio signal output provided inside the housing 10.

Further, the headset 100 includes: a driver 14 that outputs an audio signal; a microphone 16 provided so as to collect a signal propagating in the hollow part of the external auditory canal insertion part 12; a headset thermistor 18 provided at the side of the ear canal inside the housing 10; a temperature sensor 24 for the headset provided inside the housing 10 at an opposite side from the ear canal side; a reproduction unit 20 that outputs an audio signal from the driver 14; a calculation unit 22 that measures the deep body temperature based on the output of the thermistor 18 and the temperature sensor 24; a communication unit 23 that receives an audio signal from an information processing terminal (not shown) and transmits the measurement result of the calculation unit 22 to the information processing terminal; and a main substrate 25.

The reproduction unit 20, the calculation unit 22, the communication unit 23 and the temperature sensor 24 are mounted on the main substrate 25 arranged inside the housing 10.

The thermistor 18 is a sensor used to measure the operating temperature of a battery (not shown) provided inside the housing 10 during charging and discharging, and measures the temperature of the ear canal space.

The temperature sensor 24 is a sensor that is built into a sensing IC (such as a 9-axis sensor) mounted on the main substrate 25, and is a sensor arranged at a location that is not in contact with the housing 10.

The calculation unit 22 measures the deep body temperature of the user based on the output from the thermistor 18 and the output from the temperature sensor 24.

Figure 4:
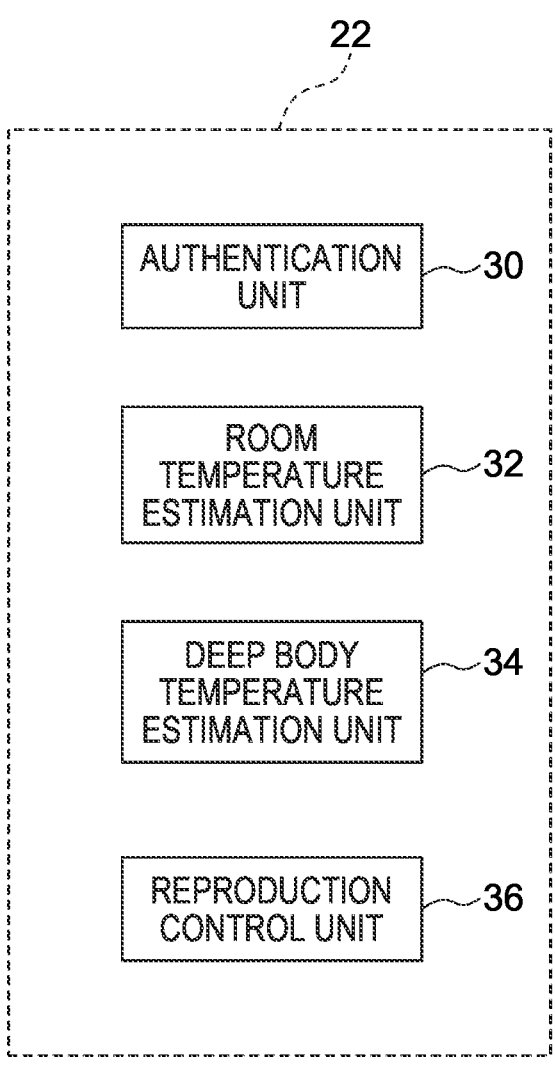
FIG. 4 is a block diagram showing a computation unit of the headset according to the first embodiment of the technique of the present disclosure.

The calculation unit 22 functionally includes an authentication unit 30, a room temperature estimation unit 32, a deep body temperature estimation unit 34, and a reproduction control unit 36, as shown in FIG. 4.

The authentication unit 30 identifies the user wearing the headset 100 by aural acoustic authentication using microphone 16.

The room temperature estimation unit 32 estimates the room temperature from the outputs of the thermistor 18 and the temperature sensor 24 under predetermined conditions. Specifically, in a case in which the temperature $T_a$ measured by the temperature sensor 24 and the temperature $T_b$ measured by the thermistor 18 are equal, the room temperature estimation unit 32 determines that the temperature $T_a$ and the temperature $T_b$ are the casing temperature, and are equal to the room temperature $T_A$, and estimates that the temperature $T_a$ or the temperature $T_b$ is the room temperature $T_A$.

The deep body temperature estimation unit 34 acquires the output of the thermistor 18 and the output of the temperature sensor 24. The deep body temperature estimation unit 34 estimates the deep body temperature of the user from the first temperature difference $t_A$ between the estimated room temperature $T_A$ and the temperature $T_a$ measured from the output of the temperature sensor 24, and the second temperature difference $t_e$ between the temperature $T_a$ measured from the output of the temperature sensor 24 and the temperature $T_b$ measured from the output of the thermistor 18.

Specifically, after waiting for a predetermined time until the thermistor 18 and the temperature sensor 24 have warmed up, the output of the thermistor 18 and the output of the temperature sensor 24 are obtained, and the deep body temperature $T_B$ is estimated as described below.

First, in a case in which the room temperature $T_A$ has been estimated, based on "the distribution of $t_e/t_e$ relative to $t_e/t_A$" determined from the measurement data at the time of headset development, and in accordance with the following formula, the deep temperature $T_B$ is estimated.

$$T_B = T_b + t_e \times f\left(\frac{t_e}{t_A}\right)$$

Figure 5:
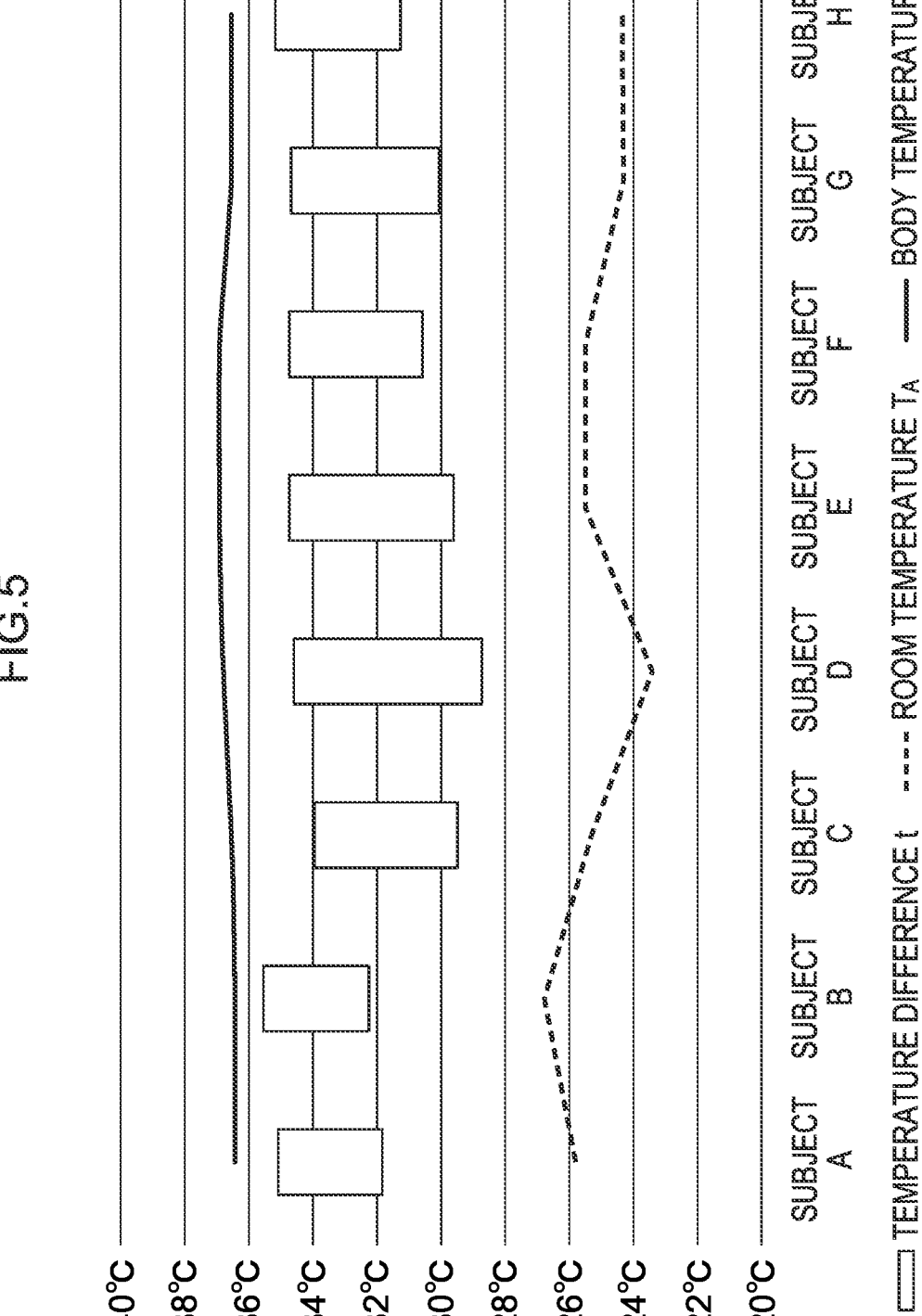
FIG. 5 is a diagram showing an example of temperature data measured during headset development.
Figure 6:
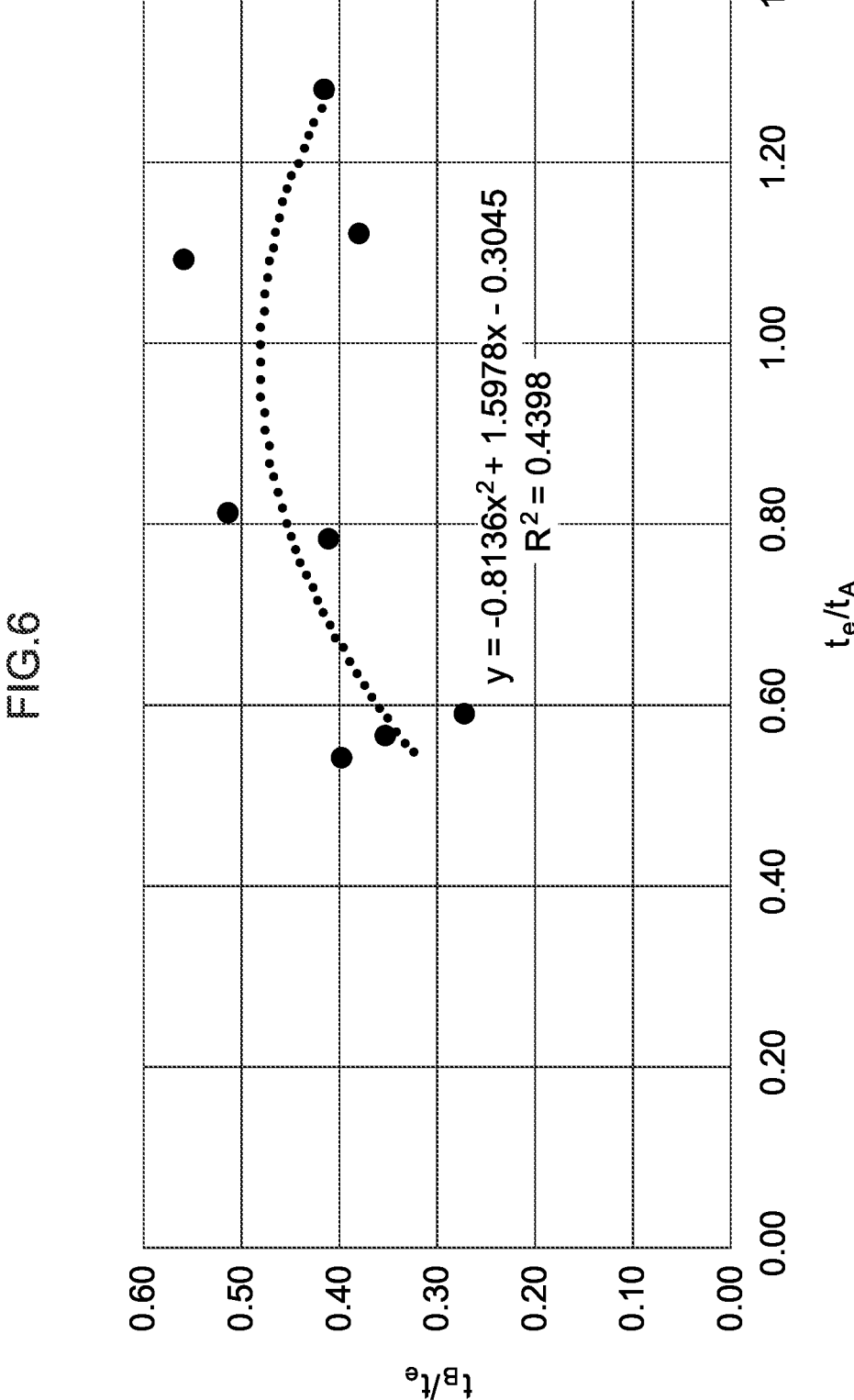
FIG. 6 is a diagram showing an example of the distribution of $t_B/t_e$ relative to $t_e/t_A$.

However, as an example, f(x) in the formula shown above is represented by the following formula when using measurement data from the time of headset development such as those shown in FIGS. 5 and 6, which show plural measurement data and distributions.

$$f(x) = -0.8136x^2 + 1.5978x - 0.3045$$

Further, from the deep body temperature $T_B$ obtained above, the temperature $T_b$ measured from the output of the thermistor 18, and the second temperature difference $t_e$, the thermal resistance ratio value $R_B/R_e$ is calculated and recorded in accordance with the following formula.

$$T_B = T_e + t_e \frac{R_B}{R_e}$$

Moreover, in a case in which the temperature $T_a$ and the temperature $T_b$ are not equal—that is, if measurement is started in a state in which the casing is partially warmed—using the value $R_B/R_e$ that was recorded last, the deep body temperature $T_B$ is estimated in accordance with the foregoing equation (2) by multiplying the temperature difference $t_e$ inside the headset with the value $R_B/R_e$, and adding the value obtained thereby to the deep body temperature $T_b$.

Note that in a case in which there is no last recorded value $R_B/R_e$, a value $R_B/R_e$ obtained by pre-measurement should be used.

The reproduction control unit 36 effects control such that the audio signal received from the information processing terminal is output via the reproduction unit 20 and the driver 14.

<Operation of Headset According to First Embodiment of Technique of Present Disclosure>

When the housing 10 of the headset 100 is worn at the user's ear, and when an instruction to measure deep body temperature is received by wireless communication from the user s information processing terminal (not shown), temperature measurement processing as shown in FIG. 7 is executed by the calculation unit 22.

First, in step S100, the authentication unit 30 identifies the user wearing the headset 100 by aural acoustic authentication using microphone 16.

In step S102, the room temperature estimation unit 32 acquires the temperature $T_b$ measured by the thermistor 18, and the temperature $T_a$ measured by the temperature sensor 24.

In step S104, the room temperature estimation unit 32 determines whether or not the temperature $T_a$ measured by the temperature sensor 24 and the temperature $T_b$ measured by thermistor 18 are equal to each other. In a case in which the temperature $T_a$ and the temperature $T_b$ are equal to each other, the processing proceeds to step S106. However, in a case in which the temperature $T_a$ and the temperature $T_b$ are not equal to each other, the processing proceeds to step S116. Note that the temperature $T_a$ measured by the temperature sensor 24 and the temperature $T_b$ measured by thermistor 18 being equal to each other is an example of a predetermined condition.

In step S106, the room temperature estimation unit 32 estimates that the temperature $T_a$ or the temperature $T_b$ is the room temperature $T_A$.

In step S108, the deep body temperature estimation unit 34 waits for a predetermined time until the thermistor 18 and temperature sensor 24 have warmed up.

In step S110, the deep body temperature estimation unit 34 acquires the temperature $T_b$ measured by the thermistor 18 the temperature $T_a$ measured by the temperature sensor 24 after a predetermined time has elapsed.

In step S112, the deep body temperature estimation unit 34 calculates the deep body temperature $T_B$ in accordance with the above-described formula (1). Further, the estimation result of the deep body temperature $T_B$ is transmitted to the information processing terminal by the communication unit 23.

In step S114, from the deep body temperature $T_B$ obtained above, the temperature $T_b$ measured from the output of the thermistor 18, and the second temperature difference $t_e$, the deep body temperature estimation unit 34 calculates and records the value $R_B/R_e$ in accordance with formula (2) described above, and the temperature measurement processing is ended.

In step S116, the deep body temperature estimation unit 34 waits for a predetermined time until the thermistor 18 and temperature sensor 24 have warmed up.

In step S118, the deep body temperature estimation unit 34 uses the last recorded value $R_B/R_e$ to estimate the deep body temperature $T_B$. Further, the estimation result of the deep body temperature $T_B$ is transmitted to the information processing terminal by the communication unit 23 and the temperature measurement processing is ended.

As described above, according to the headset according to the first embodiment of the technique of the present disclosure, based on the outputs of a headset thermistor provided inside the housing at the ear canal side and a headset temperature sensor provided inside the housing at the opposite side from the ear canal, the body temperature of the user is measured. Thereby, the body temperature can be measured with high accuracy without adding a sensor for body temperature measurement.

In the above-described embodiments, a case of using a combination of a thermistor and a temperature sensor on the main substrate has been described as an example; however, the present disclosure is not limited to this. The deep body temperature may be measured using a combination of either a thermistor on the ear canal side or the proximity sensor described below, and either a temperature sensor on the main substrate at the opposite side from the ear canal side or the touch pad described below.

Second Embodiment

Next, a headset according to a second embodiment will be described. Parts having the same configuration as in the first embodiment are denoted by the same reference numerals, and descriptions thereof are omitted.

The second embodiment differs from the first embodiment in that the deep body temperature is estimated using the outputs of four sensors for the headset.

<Outline of Second Embodiment of Technique of Present Disclosure>

A headset may be equipped with a number of temperature sensing devices. In the present embodiment, deep body temperature is measured from plural temperature transfer systems formed using four sensors serving as temperature sensing devices.

Figure 8:
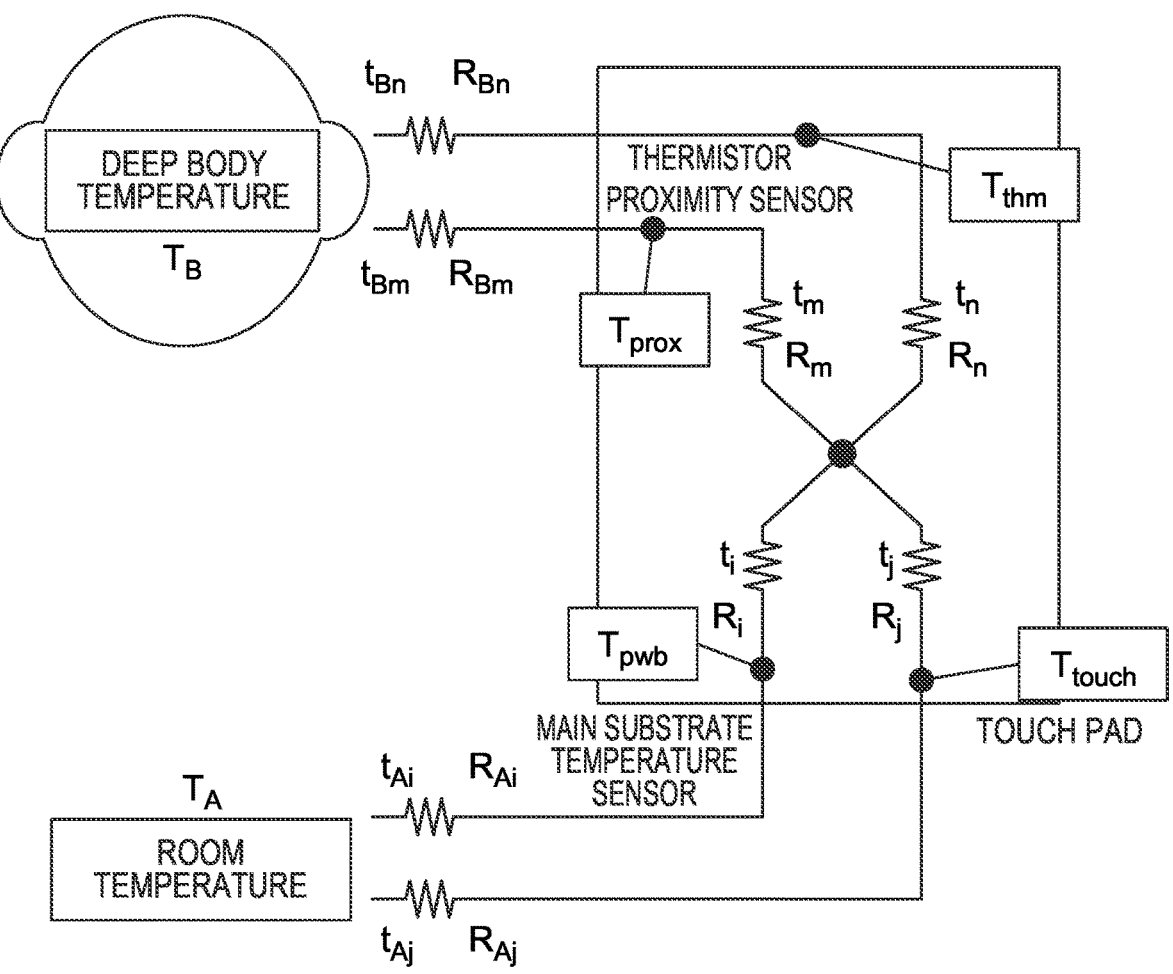
FIG. 8 is a diagram for explaining a method of estimating deep body temperature with a headset according to a second embodiment of the technique of the present disclosure.

FIG. 8 shows the configuration of thermal resistance and parameters in the plural temperature transfer systems. Here, explanation of variables that are the same as in the first embodiment is omitted.

The temperature measured by the thermistor is $T_{thm}$, and the temperature measured by the temperature sensor on the main substrate is $T_{pwb}$. The temperature measured by the proximity sensor is $T_{prox}$, and the temperature measured by the touchpad is $T_{touch}$. In addition, the temperature difference between the room temperature $T_A$ and the temperature $T_{pwb}$ is tai, the temperature difference between the room temperature $T_A$ and the temperature $T_{touch}$ is $t_{Aj}$, the temperature difference between the temperature $T_{thm}$ and the temperature $T_{pwb}$ is $t_i+t_n$, the temperature difference between the temperature $T_{prox}$ and the temperature $T_{pwb}$ is $t_i+t_m$, the temperature difference between the temperature $T_{thm}$ and the temperature $T_{touch}$ is $t_j+t_n$, the temperature difference between the temperature $T_{prox}$ and the temperature $T_{touch}$ is $t_j+t_m$, the temperature difference between the deep body temperature $T_B$ and the temperature $T_{thm}$ is $t_{Bn}$, and the temperature difference between the deep body temperature $T_B$ and the temperature $T_{prox}$ is $t_{Bm}$.

Moreover, the thermal resistance corresponding to the temperature difference tai is $R_{Ai}$, the thermal resistance corresponding to the temperature difference $t_{Aj}$ is $R_{Aj}$, the thermal resistance corresponding to the temperature difference $t_i+t_n$ is $R_i+R_n$, the thermal resistance corresponding to the temperature difference $t_i+t_m$ is $R_i+R_m$, the thermal resistance corresponding to the temperature difference $t_j+t_n$ is $R_j+R_n$, the thermal resistance corresponding to the temperature difference $t_j+t_m$ is $R_j+R_m$, the thermal resistance corresponding to the temperature difference $t_{Bn}$ is $R_{Bn}$, and the thermal resistance corresponding to the temperature difference $t_Bm$ is $R_{Bm}$.

In addition, the correlations between the respective temperature differences described above and the respective thermal resistances described above and the temperature differences $t_A$, $t_e$, $t_B$ and the thermal resistances $R_A$, $R_e$, $R_B$ in the first embodiment are shown in FIG. 9. While FIG. 9 shows the parameter components in a case in which there are four temperature transfer systems, this varies depending on the number of sensors installed.

Next, restrictions for each sensor are described. Since the thermal resistance values inside the headset ($R_i$, $R_j$, $R_m$, $R_n$) have the same structure, there is no difference between products. Further, depending on ambient air conditioning and sunlight conditions, the thermal resistances $R_{Ai}$, $R_{Aj}$ between the headset and the room temperature are different for each measurement. Moreover, since the wearing state differs for each user, there are individual differences in the thermal resistances $R_{Bm}$, $R_{Bn}$ between the headset and the deep body temperature. For this reason, errors occur when the deep body temperature of plural users is measured using the same casing and the same parameters.

Therefore, in the present embodiment, deep body temperature is measured as follows.

First, in prior preparation for measurement—that is, in the creation of parameters during headset development—based on the room temperature $T_A$ and the deep body temperature $T_B$ measured in advance using a thermometer and a body thermometer, the ratio of $t_A$, $t_e$ is determined for each of the four temperature transfer systems.

Deep body temperature is then measured as follows.

Here, the thermal resistances $R_A$, $R_B$ vary from measurement to measurement owing to the influence of the wearing state and the air conditioning at the time of measurement. Therefore, the ratio of $t_A$, $t_e$ that is measured having waited a predetermined time until the sensor warms up is compared with the ratio of $t_A$, $t_e$ in the four temperature transfer systems obtained in the prior preparation, and the temperature transfer system that most closely matches the prior preparation conditions is selected.

Then, using $t_A$, $t_e$ of the selected temperature transfer system, the temperature difference $t_B$ and the deep body temperature $T_B$ are determined.

In addition, regarding the room temperature $T_A$, the temperature in a state in which the temperature of the entire casing is constant (a state in which temperature $T_{pwb}$, $T_{thm}$ are equal) without any local temperature rises due to body temperature, is the room temperature $T_A$.

In a case in which there is local warming due to body temperature and the room temperature $T_A$ cannot be calculated, the deep body temperature $T_B$ is determined by using parameters using previous body temperature measurements from a predetermined temperature transfer system.

<Configuration of Headset According to Second Embodiment of Technique of Present Disclosure>

Figure 10:
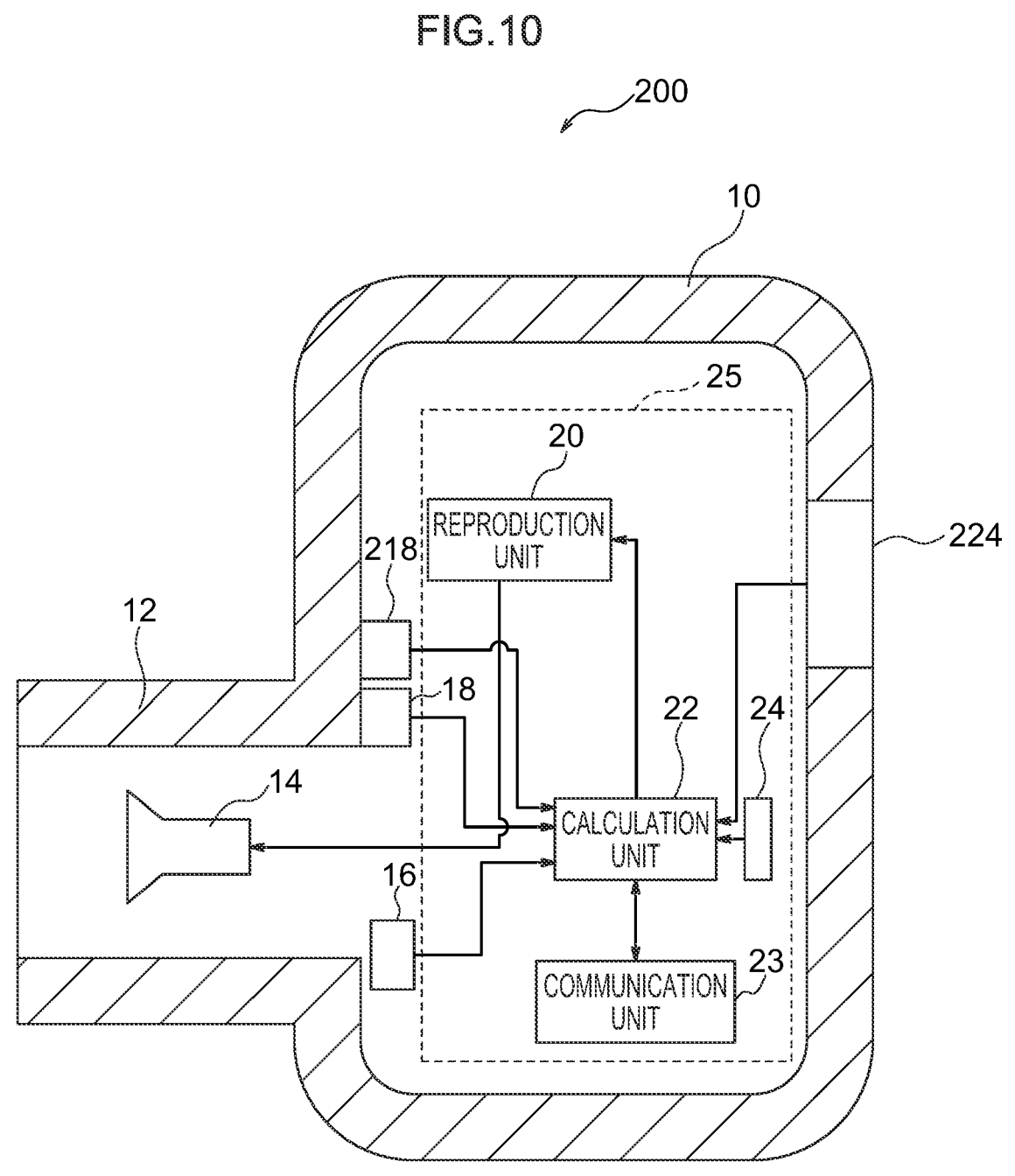

As shown in FIG. 10, a headset 200 according to the second embodiment of the technique of the present disclosure is provided, in addition to the same configuration as the headset 100 according to the first embodiment described above, with a proximity sensor 218 for the headset provided inside the housing 10 at an opposite side from the ear canal side, and a touch pad 224 for the headset provided inside the housing 10 at an opposite side from the ear canal side.

The proximity sensor 218 is a capacitive sensor used to determine whether the headset is being worn at an ear. Since the sensor output and the temperature of the proximity sensor 218 have linearity, the temperature of the proximity sensor 218 can be measured from the output of the proximity sensor 218.

The touch pad 224 is a capacitive sensor used to detect user operations (playback, stop, etc.). Further, since the sensor output and the temperature of the touch pad 224 have linearity, the temperature of the touch pad 224 can be measured from the output of the touch pad 224.

The calculation unit 22 measures the deep body temperature based on the output from the thermistor 18, the output from the temperature sensor 24, the output from the proximity sensor 218, and the output from the touch pad 224.

Figure 11:
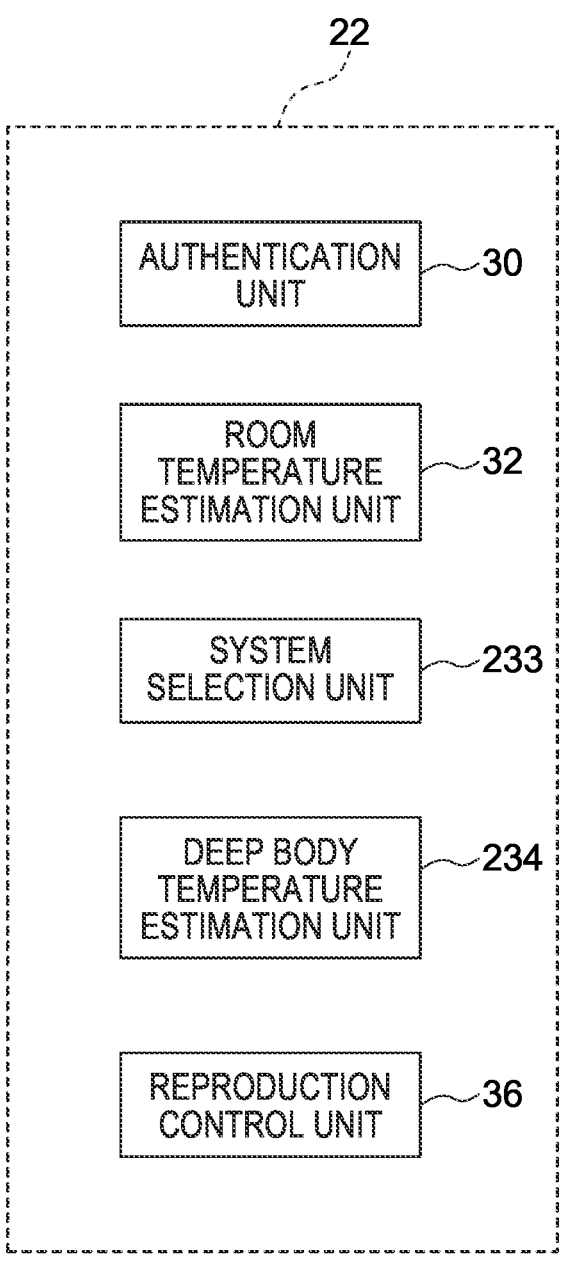
FIG. 11 is a block diagram showing a computation unit of the headset according to the second embodiment of the technique of the present disclosure.

Specifically, the calculation unit 22 functionally includes an authentication unit 30, a room temperature estimation unit 32, a system selection unit 233, a deep body temperature estimation unit 234, and a reproduction control unit 36, as shown in FIG. 11.

The system selection unit 233 selects any one of the four temperature transfer systems that are combinations of either the thermistor 18 or the proximity sensor 218 on the ear canal side, and either the temperature sensor 24 or the touch pad 224 on the opposite side from the ear canal side.

Specifically, after waiting for a predetermined time until the thermistor 18 and the temperature sensor 24 have warmed up, the system selection unit 233 acquires the output from the thermistor 18, the output from the temperature sensor 24, the output from the proximity sensor 218, and the output from the touch pad 224. For each of the four temperature transfer systems, the system selection unit 233 calculates the ratio of the temperature difference $t_A$ from room temperature, and the temperature difference $t_e$ inside the headset. Then, the system selection unit 233, for each of the four temperature transfer systems, compares the currently calculated ratio with the ratio of the temperature difference $t_A$ from room temperature and the temperature difference $t_e$ inside the headset calculated for the temperature transfer system in the prior preparation. Then, the system selection unit 233 selects the temperature transfer system that is closest to the ratio calculated in the prior preparation.

The deep body temperature estimation unit 234 acquires the sensor output of the selected temperature transfer system and, from the first temperature difference $t_A$ from the estimated room temperature $T_A$, and the second temperature difference $t_e$ inside the headset, in the selected temperature transfer system, estimates the deep body temperature of the user.

Specifically, the deep body temperature $T_B$ is estimated as described below.

First, in a case in which the room temperature $T_A$ has been estimated, the deep body temperature $T_B$ is estimated in accordance with the foregoing formula (1) based on the "distribution of $t_e/t_e$ relative to $t_e/t_A$" determined from measurement data during headset development.

At this time, in a case in which the selected temperature transfer system is a temperature transfer system formed from a combination of the thermistor 18 and the temperature sensor 24, the temperature $T_{thm}$ measured from the output of thermistor 18 is $T_b$, the temperature difference $t_i + t_n$ is $t_e$, and the temperature difference tai is $t_A$. As parameters for f(x), parameters determined using the measurement data of this temperature transfer system are used.

Further, when the selected temperature transfer system is a temperature transfer system formed from a combination of the thermistor 18 and the touch pad 224, the temperature $T_{thm}$ measured from the output of thermistor 18 is $T_b$, the temperature difference $t_i + t_n$ is $t_e$, and the temperature difference $t_{Aj}$ is $t_A$. As parameters for f(x), parameters determined using the measurement data of this temperature transfer system are used.

Further, when the selected temperature transfer system is a temperature transfer system formed from a combination of the proximity sensor 218 and the touch pad 224, the temperature $T_{prox}$ measured from the output of the proximity sensor 218 is $T_b$, the temperature difference $t_j + t_m$ is $t_e$, and the temperature difference $t_{Aj}$ is $t_A$. As parameters for f(x), parameters determined using the measurement data of this temperature transfer system are used.

Further, when the selected temperature transfer system is a temperature transfer system formed from a combination of the proximity sensor 218 and the temperature sensor 24, the temperature $T_{prox}$ measured from the output of the proximity sensor 218 is $T_b$, the temperature difference $t_i + t_m$ is $t_e$, and the temperature difference tai is $t_A$. As parameters for f(x), parameters determined using the measurement data of this temperature transfer system are used.

Further, from the deep body temperature $T_B$ obtained as described above, and the temperature $T_b$ and the second temperature difference $t_e$ corresponding to this temperature transfer system, in accordance with formula (2) above, the value $R_B/R_e$ is calculated and is recorded as the value of $R_B/R_e$ for the selected temperature transfer system.

Further, in a case in which the temperature $T_{pwb}$ and the temperature $T_{thm}$ are not equal—that is, if measurement is started in a state in which the casing is partially warmed— the deep body temperature $T_B$ is estimated in accordance with formula (2) above using the last recorded $R_B/R_e$ value for the temperature transfer system consisting of the thermistor 18 and temperature sensor 24 combination, the temperature $T_b$ and the second temperature difference $t_e$ corresponding to this temperature transfer system.

Here, in a case in which there is no last recorded value $R_B/R_e$ for this temperature transfer system, a value $R_B/R_e$ obtained by preliminary measurements for the temperature transfer system should be used.

<Operation of Headset According to Second Embodiment of Technique of Present Disclosure>

Figure 12:
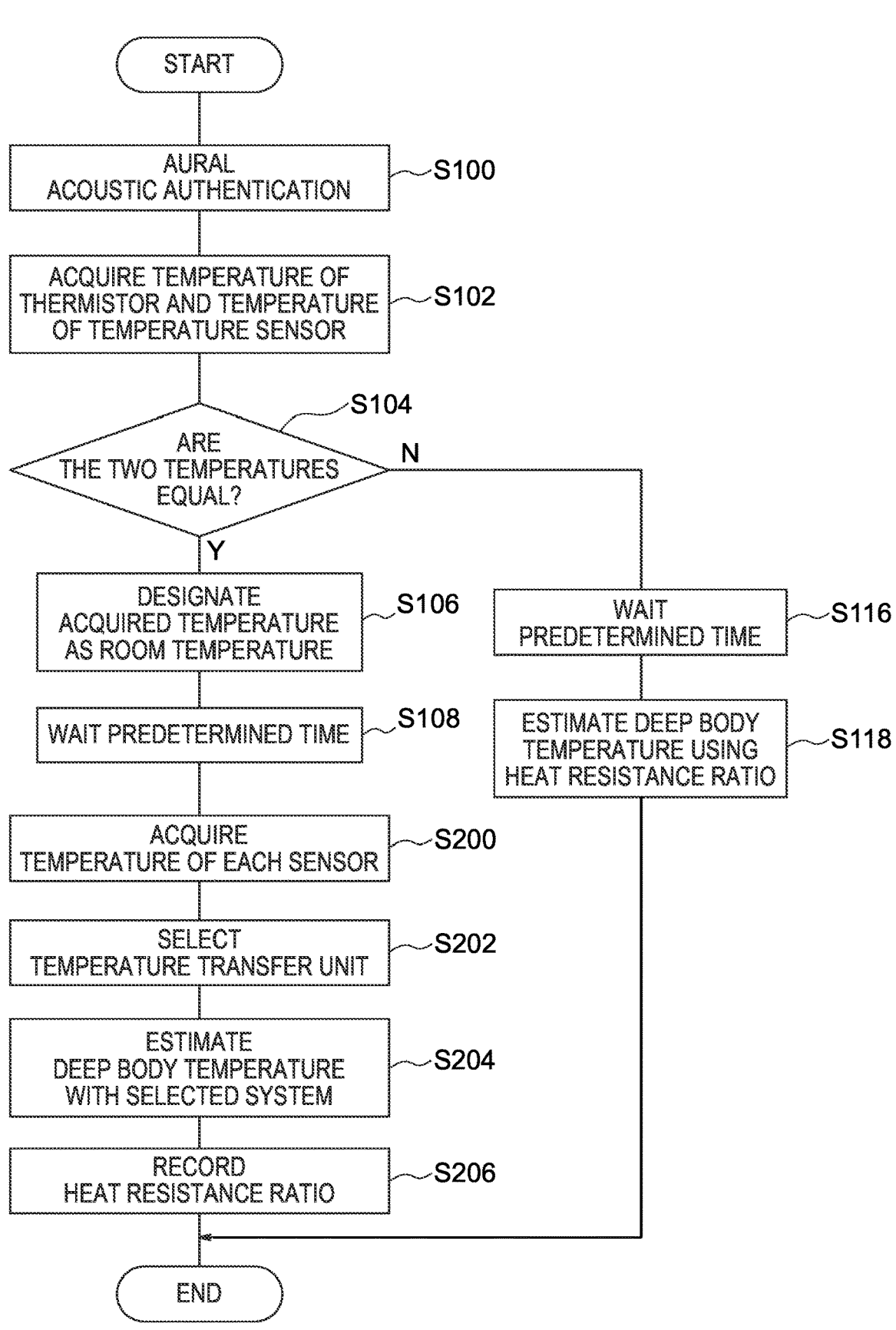
FIG. 12 is a flow chart showing details of temperature measurement processing by the headset according to the second embodiment of the technique of the present disclosure.

When the housing 10 of the headset 200 is worn at the user's ear, and when an instruction to measure deep body temperature is received by wireless communication from the user s information processing terminal (not shown), temperature measurement processing as shown in FIG. 12 is executed by the calculation unit 22.

First, in step S100, the authentication unit 30 identifies the user wearing the headset 200 by aural acoustic authentication using microphone 16.

In step S102, the room temperature estimation unit 32 acquires the temperature $T_{thm}$ measured by the thermistor 18, and the temperature $T_{pwb}$ measured by the temperature sensor 24.

In step S104, the room temperature estimation unit 32 determines whether or not the temperature $T_{pwb}$ measured by the temperature sensor 24 and the temperature $T_{thm}$ measured by thermistor 18 are equal to each other. In a case in which the temperature $T_{pwb}$ and the temperature $T_{thm}$ are equal to each other, the processing proceeds to step S106. However, in a case in which the temperature $T_{pwb}$ and the temperature $T_{thm}$ are not equal to each other, the processing proceeds to step S116.

In step S106, the room temperature estimation unit 32 estimates the temperature $T_{pwb}$ or the temperature $T_{thm}$ as the room temperature $T_A$.

In step S108, the system selection unit 233 waits for a predetermined time until the thermistor 18 and the temperature sensor 24 warm up.

In step S200, the system selection unit 233 acquires the temperature $T_{thm}$ measured by the thermistor 18, the temperature $T_{pwb}$ measured by the temperature sensor 24, the temperature $T_{prox}$ measured from the output from the proximity sensor 218, and $T_{touch}$ as measured from the output from the touch pad 224.

In step S202, for each of the four temperature transfer systems, the system selection unit 233 calculates the ratio of the temperature difference $t_A$ from room temperature and the temperature difference $t_e$ inside the headset. Then, the system selection unit 233, for each of the four temperature transfer systems, compares the currently calculated ratio with the ratio of the temperature difference $t_A$ from room temperature and the temperature difference $t_e$ inside the headset calculated for the temperature transfer system in the prior preparation. Then, the system selection unit 233 selects the temperature transfer system that is closest to the ratio calculated in the prior preparation.

In step S204, the deep body temperature estimation unit 234 estimates the deep body temperature $T_B$ in accordance with formula (1) above from the first temperature difference $t_A$ from the estimated room temperature $T_A$, and the second temperature difference $t_e$ inside the headset, in the selected temperature transfer system. Further, the estimation result of the deep body temperature $T_B$ is transmitted to the information processing terminal by the communication unit 23.

In step S206, in a case in which the selected temperature transfer system is a temperature transfer system formed from a combination of the thermistor 18 and the temperature sensor 24, the deep body temperature estimation unit 234 calculates the value $R_B/R_e$ in accordance with formula (2) above from the deep body temperature $T_B$ obtained as described above, and the temperature $T_b$ and the second temperature difference $t_e$ corresponding to this temperature transfer system, and records this as the value $R_B/R_e$ of this temperature transfer system, and the temperature measurement processing is ended.

In step S116, the deep body temperature estimation unit 234 waits for a predetermined time until the thermistor 18 and temperature sensor 24 have warmed up.

In step S118, the deep body temperature estimation unit 234 estimates the deep body temperature $T_B$ in accordance with formula (2) above using the last recorded value $R_B/R_e$ for the temperature transfer system consisting of the thermistor 18 and temperature sensor 24 combination, and the temperature $T_b$ and the second temperature difference $t_e$ corresponding to this temperature transfer system. Further, the estimation result of the deep body temperature $T_B$ is transmitted to the information processing terminal by the communication unit 23 and the temperature measurement processing is ended.

As explained above, according to the headset according to the second embodiment of the technique of the present disclosure, based on the output of a headset thermistor and the output of a proximity sensor provided inside the housing at the ear canal side, and the output of a headset temperature sensor and the output of a touch pad provided inside the housing at the opposite side from the ear canal, the body temperature of the user is measured. Thereby, the body temperature can be measured with high accuracy without adding a sensor for body temperature measurement.

Further, the body temperature of the user is measured by selecting one of four temperature transfer systems that are combinations of either of the thermistor or the proximity sensor and either of the temperature sensor or the touch pad. As a result, it is possible to measure the body temperature with high accuracy, taking into account differences between measurements and individual differences.

Moreover, the room temperature can be estimated by using the thermistor, which can measure the temperature as an absolute value, and the temperature sensor on the main substrate, among the plural sensors.

Example 1

An example of the headset according to the first embodiment is explained. As shown in FIG. 13, the housing 10 of the headset of this embodiment is formed by fitting together a main housing 1a and a front housing 1b.

The main housing 1a is a hollow-shaped member having a cylindrical shape as a whole, and having a rearward opening that is closed by a cover 2. A main substrate 25 is arranged inside the main housing 1a so as to face the opening. The main substrate 25 is a board on which electronic components functioning as the reproduction unit 20, the calculation unit 22, and the communication unit 23 are mounted, and a temperature sensor 24 is arranged on the main substrate 25. In this way, the temperature sensor 24 is arranged at a location that is not in direct contact with the housing 10 or the cover 2.

A battery 6 is arranged in front of the main substrate 25 with a battery cushion 7 and a battery cap 8 interposed therebetween.

A housing rubber 9 is provided at an outer periphery of the main housing 1a. The housing rubber 9 is a cylindrical resilient member fitted around the outer periphery of the main housing 1a, which eases contact with the ear and prevents water from entering into the housing 10.

The front housing 1b is arranged so as to close off the front opening of the cylindrical main housing 1a. The front housing 1b has an oblique truncated cone shape as a whole, and a part of the peripheral edge is slightly raised toward the eardrum side.

An ear canal insertion portion 12 is provided in front of the front housing 1b and protrudes from the top of the oblique truncated cone toward the eardrum side. The ear canal insertion part 12 has a cylindrical shape provided in a part of the front housing 1b, and both the front and the rear are opened, whereby the inside and outside of the front housing 1b are communicated with each other. A driver 14 having a cylindrical case is installed inside the ear canal insertion portion 12. Therefore, a positioning portion 11 for the driver 14 is provided in the vicinity of the front opening of the ear canal insertion portion 12, and by engaging the front end of the driver 14 with the positioning portion 11, the driver 14 is fixed to the inner surface of the ear canal insertion portion 12. The rear end of the driver 14 is positioned near the front end of the front housing 1b. The driver 14 has a magnetic circuit for generating an output signal, a diaphragm, and the like in a cylindrical case, and has an appropriate well-known structure.

The headset of the present embodiment has a microphone 16. The microphone 16 is provided in the vicinity of the ear canal insertion portion 12 in the front housing 1b; that is, rearward of the driver 14.

The microphone 16 is mounted on the microphone board 15. The microphone board 15 is fixed to a block 416. The block 416 is a block-shaped member that supports the microphone 16 and the microphone board 15. The microphone board 15 and the block 416 are provided with openings 15a and 16a so that the sounds signals in the ear canal can reach the microphone 16.

A thermistor 18 is provided to measure the operating temperature of the battery 6 during charging and discharging. Further, since the thermistor 18 is arranged in the vicinity of the openings 15a and 16a, it can measure the temperature of the external auditory canal space.

The inner surface of the ear canal insertion portion 12 is provided with a second hollow portion 16A that is a groove formed along the axial direction of the ear canal insertion portion 12. The second hollow portion 16A is a rectangular groove-shaped space formed between the inner surface and a side surface of the driver 14, and extends from the front end portion of the ear canal insertion portion 12 to the opening 16a of the block 416 fixed to the front housing 1b.

An earpiece 13 is fixed to the outer periphery of the ear canal insertion portion 12. The earpiece 13 is also called an eartip, an earpad, or an earcap, and consists of an elastic member such as silicone rubber. The earpiece 13 has, at the tip of a cylindrical portion 13b fitted to the outer periphery of the ear canal insertion portion 12, a portion 13a that is formed in a hemisphere and adheres to the wall surface of the ear canal. An earpiece attachment groove 412 is provided at the outer periphery of the ear canal insertion portion 12, and a fitting portion 13c is provided at the inner periphery of the cylindrical portion 13b of the earpiece 13. The earpiece 13 is fixed to the ear canal insertion portion 12 by engagement of the fitting portion 13c with the earpiece attachment groove 412.

Example 2

An example of the headset according to the second embodiment is explained. The same reference numerals are assigned to components that are the same as those in the configuration of the first embodiment, and explanation thereof is omitted.

As shown in FIG. 14, the proximity sensor 218 is arranged on the opposite side of the microphone board 15 from the microphone 16 so as to be in close proximity to the ear. Further, since the proximity sensor 218 is arranged in the vicinity of the openings 15a and 16a, it can measure the temperature of the external auditory canal space.

Further, the touch pad 224 is arranged on a part of the cover 2. Since the touch pad 224 is arranged at the farthest place from the body, the temperature change of the cover 2 itself can be obtained.

Figure 15:
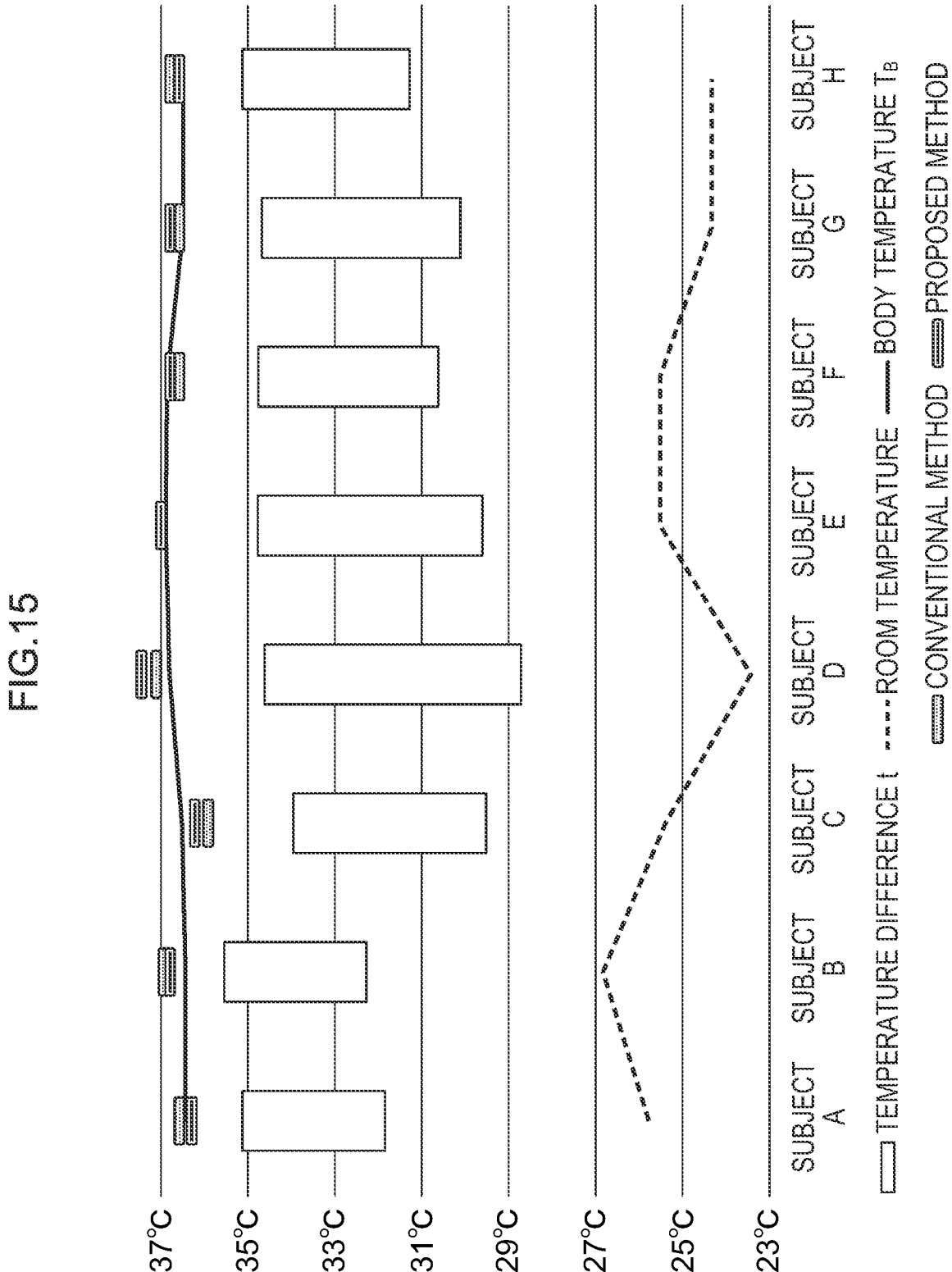
FIG. 15 is a diagram showing measurement results of deep body temperature in the headset according to Example 2.

Next, the measurement results of deep body temperature in Example 2 are explained. As shown in FIG. 15, with respect to the temperature difference in the headset and the room temperature for each subject, the deep body temperature was estimated by the method (the proposed method) explained in the second embodiment. In addition, as a conventional method for the purpose of comparison, the deep body temperature was calculated by the foregoing formula (2).

Further, the error variance was obtained by the following formula. Here, $x_n$ is the deep body temperature calculated at the nth measurement, and $T_{Bn}$ is the target deep body temperature (deep body temperature measured by a dedicated measurement device) in the nth measurement.

$$s = \sqrt{\frac{1}{n-1}\sum_{i=1}^{n}(x_i - T_{Bi})^2}$$

The error variance in the conventional method is 0.367, and the error variance in the proposed method is 0.300. Thus, it was found that the proposed method has less error than the conventional method.

The technique of the present disclosure is not limited to the above-described embodiments, and various modifications and applications are possible within a range that does not depart from the gist of the technique of the present disclosure.

For example, in the above-described second embodiment, while a case of using four sensors was described as an example, the present disclosure is not limited to this. Three sensors may be used. In this case, body temperature may be measured using two temperature transfer systems consisting of two sensors on the ear canal side and one sensor on the opposite side, or two temperature transfer systems consisting of one sensor on the ear canal side and two sensors on the opposite side. Further, five or more sensors may be used. In this case, body temperature may be measured using plural temperature transfer systems consisting of one or more sensors on the ear canal side and one or more sensors on the opposite side.

The disclosure of Japanese Application No. 2021-060540 is incorporated herein by reference in its entirety.

All publications, patent applications and technical standards mentioned herein are incorporated herein by reference to the same extent as if each individual publication, patent application and technical standard were specifically and individually indicated to be incorporated by reference.

The invention claimed is:

1. A headset, comprising:
a hollow housing to be worn at an ear of a user;
a cylindrical ear canal insertion part that is a portion of the housing, and that is provided at a portion of the housing at a side of an ear canal;
a first sensor for a headset, provided at the ear canal side inside the housing in a space communicating with the external auditory canal space;
a second sensor for a headset, provided at an opposite side from the ear canal side inside the housing at a location not in contact with the housing; and
a calculation unit that measures a body temperature of the user based on an output of the first sensor and an output of the second sensor, wherein the calculation unit:
estimates a room temperature that is a temperature outside the housing from the output of the first sensor or the second sensor under a predetermined condition wherein, when a temperature measured from the output of the first sensor and a temperature measured from the output of the second sensor are equal, said temperature is estimated as a room temperature outside the housing, and
after waiting a predetermined time, the calculation unit acquires the output of the first sensor and the output of the second sensor, and measures the body temperature of the user from a first temperature difference between the estimated room temperature and a temperature measured from the output of the first sensor, and a second temperature difference between a temperature measured from the output of the second sensor and the temperature measured from the output of the first sensor.

2. The headset of claim 1, wherein:
the first sensor includes a proximity sensor for detecting a wearing state or a thermistor for measuring a temperature inside the housing, and
the second sensor includes a sensor mounted at a main substrate or a touch pad for detecting an operation by the user.

3. The headset of claim 1, wherein:
the first sensor comprises a plurality of sensors,
the second sensor comprises a plurality of sensors, and
the calculation unit:
selects a combination of any one of the plurality of sensors of the first sensor and any one of the plurality of sensors of the second sensor, based on a temperature measured from an output of the plurality of sensors of the first sensor and a temperature measured from an output of the plurality of sensors of the second sensor, and
measures the body temperature of the user based on a temperature measured from an output of sensors included in the selected combination.

4. The headset of claim 3, wherein the calculation unit:
estimates a room temperature that is a temperature outside the housing, from the output of the first sensor or the second sensor under a predetermined condition,
obtains the output of the first sensor and the output of the second sensor,
selects the combination from a ratio of a first temperature difference between the estimated room temperature calculated for each combination of any one of the plurality of sensors of the first sensor and any one of the plurality of sensors of the second sensor, and a temperature measured from the output of the first sensor, and a second temperature difference between a temperature measured from the output of the second sensor and the temperature measured from the output of the first sensor, and
measures the body temperature of the user using the temperature measured from an output of a sensor included in the selected combination and a parameter established in advance for the combination.

5. The headset of claim 4, wherein the calculation unit measures the body temperature of the user based on the first temperature difference, the second temperature difference, and the temperature measured from the output of the first sensor, in the selected combination, at a time of measuring the body temperature of the user.

6. A headset, comprising:
a hollow housing to be worn at an ear of a user;
a cylindrical ear canal insertion part that is a portion of the housing, and that is provided at a portion of the housing at a side of an ear canal;
a first sensor for a headset, provided at the ear canal side inside the housing;

a second sensor for a headset, provided at an opposite side from the ear canal side inside the housing; and a calculation unit that measures a body temperature of the user based on an output of the first sensor and an output of the second sensor, wherein the first sensor comprises a plurality of sensors, the second sensor comprises a plurality of sensors, and the calculation unit:

selects a combination of any one of the plurality of sensors of the first sensor and any one of the plurality of sensors of the second sensor, based on a temperature measured from an output of the plurality of sensors of the first sensor and a temperature measured from an output of the plurality of sensors of the second sensor, measures the body temperature of the user based on a temperature measured from an output of a sensor included in the selected combination, estimates a room temperature that is a temperature outside the housing from the output of the first sensor or the second sensor under a predetermined condition, obtains the output of the first sensor and the output of the second sensor, selects the combination from a ratio of a first temperature difference between the estimated room temperature calculated for each combination of any one of the plurality of sensors of the first sensor and any one of the plurality of sensors of the second sensor, and a temperature measured from the output of the first sensor, and a second temperature difference between a temperature measured from the output of the second sensor and the temperature measured from the output of the first sensor, and measures the body temperature of the user using the temperature measured from an output of sensors included in the selected combination and a parameter established in advance for the combination, wherein the calculation unit:

estimates a room temperature that is a temperature outside the housing from the output of the first sensor or the second sensor under a predetermined condition wherein, when a temperature measured from the output of the first sensor and a temperature measured from the output of the second sensor are equal, said temperature is estimated as a room temperature outside the housing, and after waiting a predetermined time, the calculation unit acquires the output of the first sensor and the output of the second sensor, and measures the body temperature of the user from a first temperature difference between the estimated room temperature and a temperature measured from the output of the first sensor, and a second temperature difference between a temperature measured from the output of the second sensor and the temperature measured from the output of the first sensor.

7. The headset of claim 6, wherein:

the first sensor includes a proximity sensor for detecting a wearing state or a thermistor for measuring a temperature inside the housing, and the second sensor includes a sensor mounted at a main substrate or a touch pad for detecting an operation by the user.

8. The headset of claim 7, wherein the calculation unit measures the body temperature of the user based on the first temperature difference, the second temperature difference, and the temperature measured from the output of the first sensor, in the selected combination, at a time of measuring the body temperature of the user.

* * * * *